(«12») United States Patent
Gu et al.

(10) Patent No.: US 9,536,128 B2
(45) Date of Patent: Jan. 3, 2017

(54) THIN BIOMETRIC DETECTION MODULE

(71) Applicant: PIXART IMAGING INC., Hsin-Chu County (TW)

(72) Inventors: Ren-Hau Gu, Hsin-Chu County (TW); Yen-Min Chang, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 179 days.

(21) Appl. No.: 14/300,401

(22) Filed: Jun. 10, 2014

(65) Prior Publication Data

US 2015/0104083 A1 Apr. 16, 2015

(30) Foreign Application Priority Data

Oct. 16, 2013 (TW) .............................. 102137441 A
Jan. 9, 2014 (TW) .............................. 103100783 A

(51) Int. Cl.
*G06K 9/00* (2006.01)
(52) U.S. Cl.
CPC ..... *G06K 9/0004* (2013.01); *G06K 2009/0006* (2013.01)
(58) Field of Classification Search
CPC ..................... G06K 9/0004; G06K 2009/0006; G06K 9/00013

USPC .................................................. 382/124–127
See application file for complete search history.

(56) References Cited

U.S. PATENT DOCUMENTS

| 4,239,844 | A | * | 12/1980 | Faria | ...................... | G03G 5/087 |
| | | | | | | 252/501.1 |
| 2003/0126448 | A1* | | 7/2003 | Russo | ................ | G06K 9/00026 |
| | | | | | | 713/186 |
| 2009/0232362 | A1* | | 9/2009 | Otsubo | .............. | G06K 9/00026 |
| | | | | | | 382/115 |
| 2010/0036592 | A1* | | 2/2010 | Osaki | ........................ | B60T 7/14 |
| | | | | | | 701/113 |

FOREIGN PATENT DOCUMENTS

| CN | 100435342 C | 11/2008 |
|---|---|---|
| TW | 200705283 A | 2/2007 |
| TW | 201035883 A | 10/2010 |
| TW | 201322060 A | 6/2013 |

\* cited by examiner

*Primary Examiner* — Andrew Moyer
(74) *Attorney, Agent, or Firm* — Hauptman Ham, LLP

(57) ABSTRACT

There is provided a thin biometric detection module, which is advantageous in being able to detect scattered light from body tissue after the light transmitting in the body tissue without additional optical mechanism placed on the semiconductor optical detection pixel of the detection module for biometric detection.

20 Claims, 3 Drawing Sheets

THIN BIOMETRIC DETECTION MODULE

RELATED APPLICATIONS

The present application is based on and claims priority to Taiwanese Application Number 102137441, filed Oct. 16, 2013 and Taiwanese Application Number 103100783, filed Jan. 9, 2014, the disclosure of which is hereby incorporated by reference herein in its entirety.

BACKGROUND

1. Field of the Disclosure

This disclosure generally relates to a thin biometric detection module and, more particularly, to a module that may perform the biometric detection through detecting scattered light from the body tissue after the light passes through the body tissue and without any additional optical mechanism placed upon the semiconductor optical detection pixels.

2. Description of the Related Art

Conventionally, the optical module for detecting biometric characteristics is generally used to detect the finger so as to obtain the biometric characteristic information. According to the user's operating condition, "steady type" and "moving type" can be divided. In the "steady type", the finger is put steadily on the detection module during detection. In the "moving type", the finger is sliding over the detection module during detection. In order to obtain good optical imaging, generally optical mechanisms are necessary in order to form the imaging and thus the module has a notable size, e.g. the fingerprint detector provided by NEC with a serial number PU900-10.

With the improvement of life, portable electronic devices, such as notebook computers, cell phones and tablet computers, have become popular. As these kinds of products have the advantage of compact and light weight, the biometric detection module having a large size is not suitable to be applied to these portable electronic devices. Accordingly, the biometric detection module presently applied to the portable electronic devices almost adopts electrical detection technique. Taking the capacitive fingerprint detection module as an example, the module has a detection surface and when a finger is put on the detection surface, peaks and valleys of the fingerprint have a distance difference that can derive different electric field signals. These electric field signals are processed to indicate the finger image that will be compared in the following procedures.

SUMMARY

One object of the present disclosure is to provide a thin biometric detection module that includes a semiconductor optical detection region, a substrate and at least one light source, wherein the light source and the semiconductor optical detection region are electrically coupled to the substrate and controlled by a control module. The control module may be integrated with the semiconductor optical detection region or may be an independent circuit electrically coupled to the substrate. The advantage of the present disclosure is that the semiconductor optical detection region has a very thin thickness and enough biometric information may be acquired by putting the finger or part of human body on the module without an additional optical mechanism above the detection region.

To achieve the above object, light emitted by the light source may enter the human body and the light passing through the human body then scatters out from the human body surface. The semiconductor optical detection region has a very thin surface structure such that when the light leaves from the human body surface, the light reaches the detection region through a very short optical path. Meanwhile, as there is no additional optical mechanism to diffuse the light, the detection region may acquire enough biometric information to be post-processed. The optical detection region has a thin and abrasion-proof surface layer.

One object of the present disclosure is to provide a thin biometric detection module that includes a semiconductor optical detection region, a substrate and at least one light source, wherein the light source and the semiconductor optical detection region are electrically coupled to the substrate and controlled by a control module. The control module may be integrated with the semiconductor optical detection region or may be an independent circuit electrically coupled to the substrate. The advantage of the present disclosure is that the semiconductor optical detection region has a very thin thickness and enough biometric information may be acquired by putting the finger or part of human body on the module without an additional optical mechanism above the detection region. Furthermore, along a moving direction of the finger, at least two types of detection pixels are disposed at different positions with respect to the moving direction so as to respectively detect optical images of the finger at different times when necessary. The required biometric characteristic may be calculated according to the time difference between the optical images.

One object of the present disclosure is to provide a thin biometric detection module that includes a semiconductor optical detection region, a substrate and at least one light source, wherein the light source and the semiconductor optical detection region are electrically coupled to the substrate and controlled by a control module. The control module may be integrated with the semiconductor optical detection region or may be an independent circuit electrically coupled to the substrate. The advantage of the present disclosure is that the semiconductor optical detection region has a very thin thickness and enough biometric information may be acquired by putting the finger or part of human body on the module without an additional optical mechanism above the detection region. Furthermore, the optical detection region includes at least two types of different detection pixels so as to respectively detect different optical images of the finger when necessary and to accordingly calculate the required biometric characteristic.

One object of the present disclosure is to provide a thin biometric detection module that includes a semiconductor optical detection region, a substrate and a plurality of light sources, wherein the light sources emit light of different wavelengths. The light sources and the semiconductor optical detection region are electrically coupled to the substrate and controlled by a control module. The control module may be integrated with the semiconductor optical detection region or may be an independent circuit electrically coupled to the substrate. The semiconductor optical detection region may detect light corresponding to the light emission of the light sources. The advantage of the present disclosure is that the semiconductor optical detection region has a very thin thickness and enough biometric information may be acquired by putting the finger or part of human body on the module without an additional optical mechanism above the detection region.

To achieve the above object, light emitted by the light source may enter the human body and the light passing through the human body then scatters out from the human body surface. The semiconductor optical detection region has a very thin surface structure such that when the light leaves from the human body surface, the light reaches the detection region through a very short optical path. Meanwhile, as there is no additional optical mechanism to diffuse the light, the detection region may acquire enough biometric information to be post-processed. The optical detection region has a thin and abrasion-proof surface layer.

The present disclosure provides a thin biometric detection module adapted to detect at least one biometric characteristic of a part of human body. The thin biometric detection module includes a substrate, a chip, at least one light source and an abrasion-proof layer. The substrate has a substrate surface. The chip is disposed on the substrate surface and has a semiconductor optical detection region. The least one light source is disposed on the substrate surface. The abrasion-proof layer is formed on a chip surface of the chip, and a distance from the chip surface to an upper surface of the abrasion-proof layer is smaller than 100 micrometers, wherein the upper surface of the abrasion-proof layer is configured to be directly in contact with a body surface of the part of human body when detecting the biometric characteristic such that light emitted from the light source directly illuminates the body surface and sequentially passes through the part of human body and the abrasion-proof layer to be detected by the semiconductor optical detection region.

The present disclosure provides a thin biometric detection module adapted to detect at least one biometric characteristic of a part of human body. The thin biometric detection module includes a plurality of linear semiconductor optical detection regions, at least one light source, an abrasion-proof layer and a control module. The abrasion-proof layer is overlaid on the linear semiconductor optical detection regions, and a thickness of the abrasion-proof layer is smaller than 100 micrometers. The control module is electrically coupled to the linear semiconductor optical detection regions and the light source and configured to detect the biometric characteristic according to optical images of a body surface of the part of human body captured by different of the linear semiconductor optical detection regions at different times, wherein an upper surface of the abrasion-proof layer is configured to be directly in contact with the body surface when detecting the biometric characteristic such that light emitted from the light source directly illuminates the body surface and sequentially passes through the part of human body and the abrasion-proof layer to be detected by the linear semiconductor optical detection regions.

The present disclosure provides a thin biometric detection module adapted to detect at least one biometric characteristic of a part of human body. The thin biometric detection module includes a semiconductor optical detection region, at least one light source, an abrasion-proof layer and a control module. The semiconductor optical detection region is configured to capture a plurality of optical images of a body surface of the part of human body at a frame rate higher than 300 frames per second. The abrasion-proof layer is overlaid on the semiconductor optical detection region, and a thickness of the abrasion-proof layer is smaller than 100 micrometers. The control module is electrically coupled to the semiconductor optical detection region and the light source and configured to generate a surface image associated with the body surface according to the optical images captured by the semiconductor optical detection region at different times and to accordingly detect the biometric characteristic according to the surface image, wherein an upper surface of the abrasion-proof layer is configured to be directly in contact with the body surface when detecting the biometric characteristic such that light emitted from the light source directly illuminates the body surface and sequentially passes through the part of human body and the abrasion-proof layer to be detected by the semiconductor optical detection region.

In the thin biometric detection module according to the embodiment of the present disclosure, the control module may detect the biometric characteristic according to optical images of the identical area of the body surface captured by the semiconductor optical detection region at different times or according to optical images of different areas of the body surface captured by the semiconductor optical detection region at the same time, wherein the control module may be integrated in the chip or disposed on the substrate.

DETAILED DESCRIPTION OF THE EMBODIMENT

Figure 1:
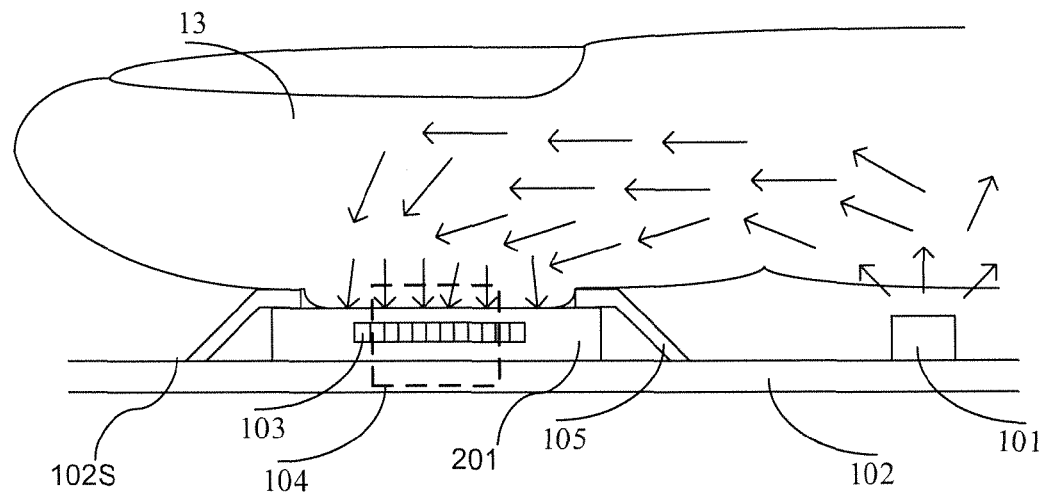
FIG. 1 shows an embodiment of the present disclosure.

Detailed descriptions below include several embodiments of the present disclosure and drawings of the user operation so as to better understand how the present disclosure is apply to actual operating conditions. It should be noted that in the drawings below the element not directly related to the present disclosure is omitted and to clearly show the relationship between elements the size ratio therebetween in the drawings may not be actual size ratio.

Figure 4A:
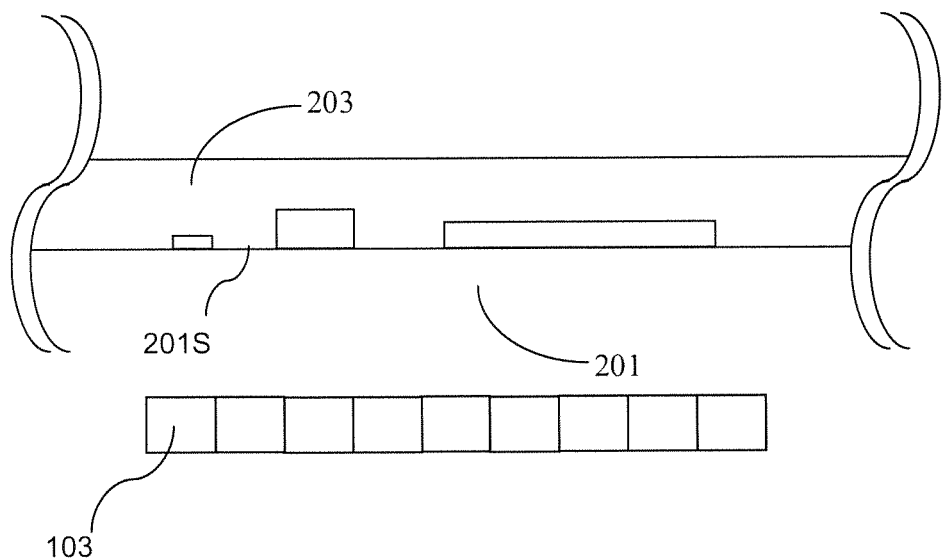
FIGS. 4a and 4b show cross-sectional views of the semiconductor optical detection region of the present disclosure.
Figure 4B:
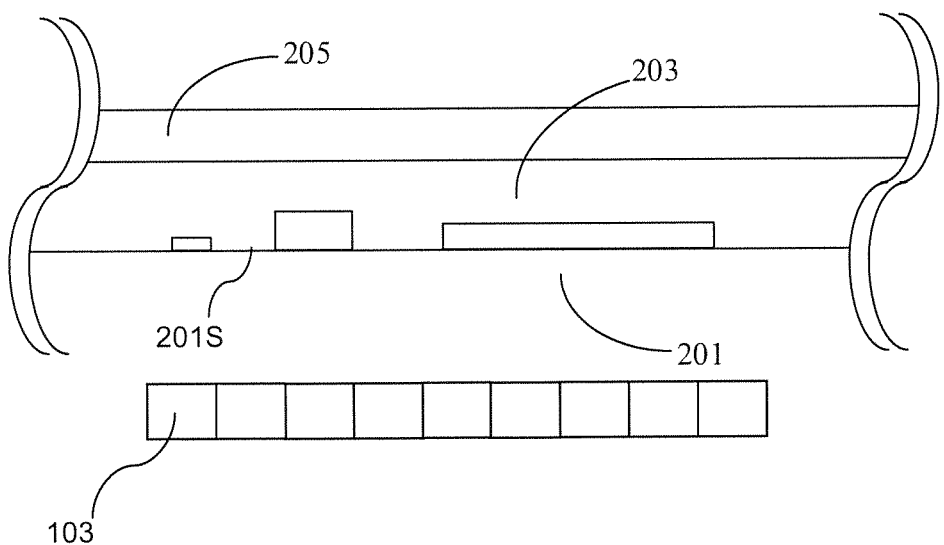

FIG. 1 shows an embodiment of the present disclosure including at least one light source 101, a substrate 102, a plurality of detection pixels 103 and a plurality of contact points 105, wherein the detection pixels 103 form a semiconductor optical detection region, which has a thin semiconductor structure 104 (further illustrated in FIGS. 4a and 4b). The contact points 105 are configured to electrically connect the semiconductor optical detection region to the substrate 102 for being controlled by a control module (not shown), wherein the detection pixels 103 may be arranged in a chip 201 and the contact points 105 are served as outward electrical contacts of the chip 201. The light source 101 is also electrically connected to the substrate 102, and the control module is configured to control the light emission of the light source 101 such that the emitted light may enter the body tissue (proper part of human body) of a user. For example, in this embodiment a finger 13 is taken as an example. Meanwhile, the control module is also configured to control the detection pixels 103 to detect light transmitting out from the finger 13. As vessels, blood in the finger and the fingerprint on the finger surface have different optical properties, the biometric characteristic may be identified according to the optical images detected by the detection pixels 103 by arranging specific light source 101.

More specifically, the control module may be integrated in the chip 201 or disposed on the substrate 102 (on the same or different surfaces of the substrate 102 with respect to the chip 201) and configured to control the light source 101 and the semiconductor optical detection region. The substrate 102 has a substrate surface 102S, and the chip 201 and the light source 101 are disposed on the substrate surface 102S.

In this embodiment, in order to effectively reduce the total size, a relative distance between the chip 201 and the light source 101 is preferably smaller than 8 millimeters.

In this embodiment, the contact points 105 may be the lead frame structure. In other embodiments, the contact points 105 may be bumps, the ball grid array or wire leads, and are not limited to those disclosed in the present disclosure.

For example, if it is desired to detect the fingerprint of the finger 13, the light source 101 may be infrared invisible light source such that the user is not bothered by the light. If it is desired to allow the user to feel the detecting condition, other light colors may be adopted. After entering the finger, the light scatters and diffuses in the inner tissue and penetrates an outer surface of the fingerprint when reaching an inner surface of the fingerprint. As the fingerprint has the feature of valleys and ridges, the light scatters when penetrating out from the valleys, which are not in contact with the detection region, such that dark lines may be formed on the detection pixels 103 that are directly under the valleys due to less light being detected; on the contrary, when the light penetrates out from the ridges, which are in contact with the detection region, bright lines may be formed on the detection pixels 103 that are directly under the ridges due to more light being detected. The variation of these bright and dark lines indicates features of the fingerprint.

When an area of the detection region is large enough to detect enough fingerprint features, the user only needs to put substantially the center of the fingerprint on the detection region without sliding the finger to allow the detection region to successively capture images associated with the fingerprint. The detection region is large enough with an area larger than 25 mm$^2$.

In this embodiment, the semiconductor optical detection region may successively capture images at a frame rate higher than hundreds of frames per second. For example, the control module may control the semiconductor optical detection region to capture optical images at a frame rate higher than 300 frames per second and control the light source 101 to emit light in association with the image capturing such that enough and continuous fingerprint images may be acquired in order to piece up a larger fingerprint image that may indicate fingerprint features. In other words, the control module may detect the biometric characteristic according to the optical images of partially identical body surfaces or different body surfaces captured by the semiconductor optical detection region at different times.

Figure 2A:
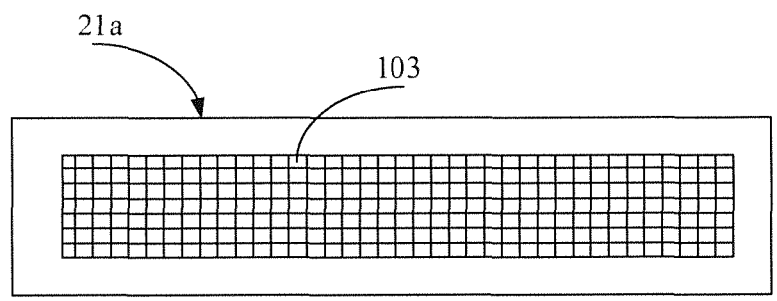
FIGS. 2a and 2b show upper views of the semiconductor optical detection region of the present disclosure.
Figure 2B:
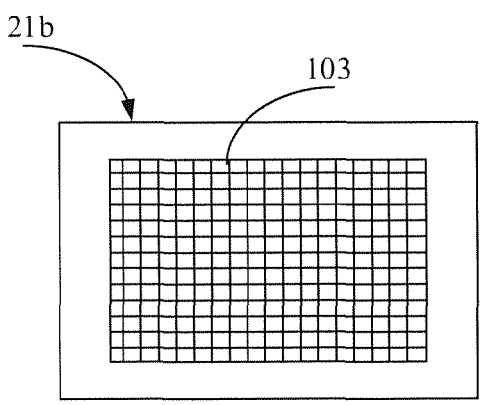

FIGS. 2a and 2B show upper views of the semiconductor optical detection region according to the embodiment of the present disclosure, wherein FIG. 2a shows the detection region 21a as a linear type. It is known from the figure that a plurality of detection pixels 103 are arranged in an elongated shape and a transverse width thereof is preferably close to the width of a thumb, e.g. 1 cm, in order to acquire enough information when the user is sliding the finger thereon. In addition, a longitudinal width may be very small, e.g. 0.3 mm to 2 mm. As the detection region may successively capture images at a high frame rate, when the finger of user is sliding over the detection region along the longitudinal direction, continuous and enough images may be captured. For example, when the user slides the finger over the detection surface at a speed of 10 cm/s and the detection surface captures images at a frame rate of 500 frames per second, a distance step between every two images is 0.2 mm, which is still within the range of the longitudinal width, such that the detection region may still capture continuous images. As a high frame rate over 1,000 frames per second may be implemented in this embodiment, continuous and enough images may still be captured even though the longitudinal width is very small. These images may be used to piece up the fingerprint or the vein texture in the user's body for the user identification. In other words, the control module may detect the biometric characteristic according to the optical images of partially identical human body surfaces or different human body surfaces captured by the semiconductor optical detection region (e.g. the linear semiconductor optical detection region herein) at different times. For example in one embodiment, the control module may be configured to generate a surface image associated with the part of human body according to the optical images captured by the semiconductor optical detection region at different times and detect the biometric characteristic according to the surface image, e.g. piecing up the fingerprint or vein texture.

For detecting other biometric characteristics, e.g. the blood oxygenation, the heartbeat (pulse) and the blood pressure, as the user does not slide the finger with respect to the detection surface quickly, the size of the detection region does not obviously affect the detected result. In other embodiments, a plurality of linear semiconductor optical detection regions may be arranged in parallel along a predetermined direction (e.g. the longitudinal width direction) and the body surface of the part of human body slides along the predetermined direction. The control module may detect the biometric characteristic according to the optical images of the identical human body surface captured by the semiconductor optical detection region (e.g. the linear semiconductor optical detection regions herein) captured at different times.

FIG. 2b shows the detection region 21b as a rectangular type. The difference from FIG. 2a of FIG. 2b is the rectangular shape of the pixel arrangement, wherein a ratio of the transverse and longitudinal widths may be between 0.5 and 2. In this manner, no matter which of the biometric characteristics such as the vein texture, fingerprint, blood oxygenation, pulse or blood pressure is to be detected by the user, the user only needs to attach the finger or the human body surface to the detection region without sliding or moving thereon so as to accomplish the detection. Compared with the linear detection region, the rectangular shape is suitable to detect various biometric characteristics. A detection area of the detection region 21b is preferably at least larger than 25 mm$^2$.

Figure 3A:
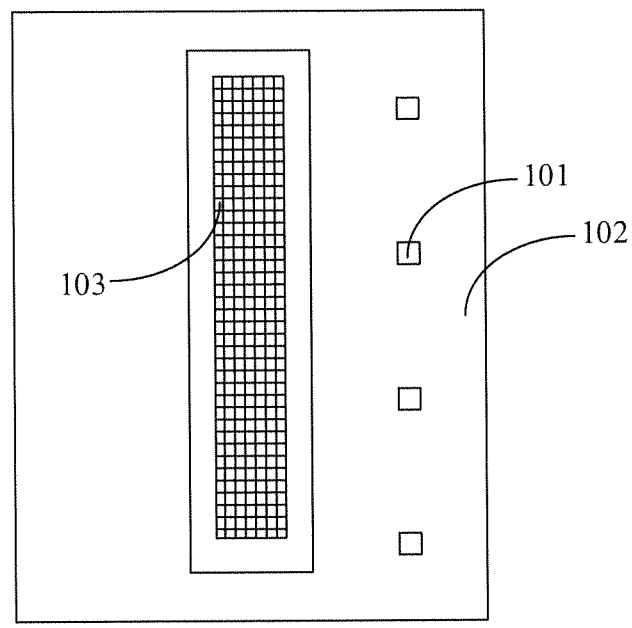
FIGS. 3a and 3b show upper views of the thin biometric detection module of the present disclosure.
Figure 3B:
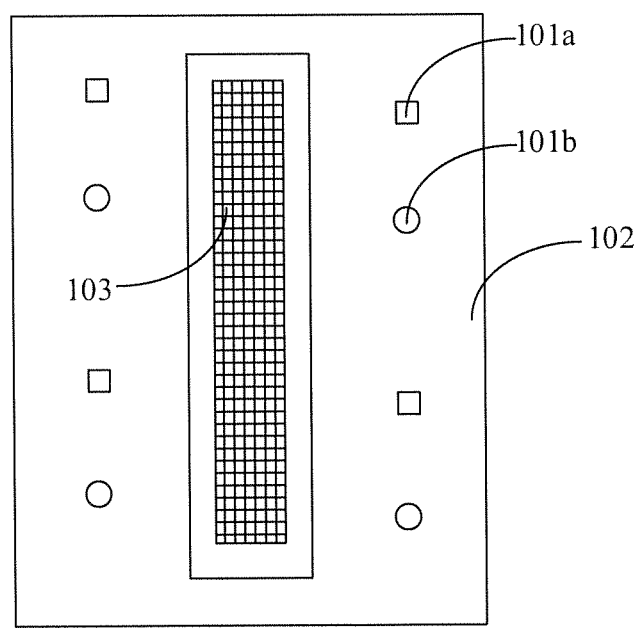

FIGS. 3a and 3B show upper views of the thin biometric detection module according to the embodiment of the present disclosure, which show the arrangement of the light source and the application using a plurality of light sources. FIG. 3a shows that the light source 101 is arranged at one side of a plurality of detection pixels 103 and electrically connected to the substrate 102. It should be noted that in this embodiment, taking the user's finger as an example, although the light source 101 is arranged at one side of the detection pixels 103, as the light may penetrate into the body tissue of the user, the position of the light source does not affect the direction of putting the finger as long as the finger is continuously illuminated by the light source during the detection process.

In FIG. 3b, two different light sources 101a and 101b are shown. In this embodiment, "different light sources" is referred to the light sources emitting light of different wavelengths. As different components in the body tissue have different optical response toward different light wavelengths, e.g. having different absorptions, by detecting different light sources the biometric characteristic associated with the wavelengths may be derived and the correction may be performed according to the detected images associated with different light sources so as to obtain more correct detected results. For example, the oxygen component in the blood has different absorptions associated with different light colors, and thus by detecting the energy of different light colors the blood oxygenation may be derived. For example, when the user is sliding the finger thereon, an identical image is detected by detection pixels at different positions at different times, i.e. having a time different, these images may be used as a basis of correction. In other words, the thin biometric detection module according to the embodiment of the present disclosure may include two light sources respectively emit light of different wavelengths, and the semiconductor optical detection region may include two types of detection pixels configured to respectively detect the light of different wavelengths.

For example, if the blood oxygenation is to be detected, two light wavelengths close to the absorption wavelength 805 nm of HbO2 and Hb may be selected, e.g. about 660 nm and 940 nm. Or the light wavelength between 730 nm and 810 nm or between 735 nm and 895 may be selected. The blood oxygenation may be derived according to the difference of light absorption of blood between the two light wavelengths. The related detection technology is well known to the art and thus details thereof are not described herein.

According to FIGS. 3a and 3b, it is known that a plurality of light sources may be employed in the present disclosure and is not limited to employ only a single light source or two light sources. Furthermore, according to the biometric characteristic to be detected, different detection pixels may be arranged corresponding to more light sources and the position of the light sources does not have particular limitation. With the thin structure, the biometric detection module of the present disclosure may be applied to detect several biometric characteristics. For the fingerprint detection, only two light sources may be disposed at a side in order to acquire enough variation of bright and dark lines. Different light sources may also be adopted in order to detect other biometric characteristics. If it is desired to acquire more uniform images, identical light sources may be arranged at two sides of same detection regions such that the light may enter the body tissue from two sides of the same detection regions.

FIGS. 4a and 4b show cross sectional views of the semiconductor optical detection region according to the embodiment of the present disclosure, which are partial schematic diagrams of the thin semiconductor structure 104. FIG. 4a shows an embodiment that a planar layer 203 also has the abrasion-proof ability. For example, the planar layer 203 made of polyimide material may have enough abrasion-proof ability to be applied to the present disclosure. That is, the planar layer 203 is also served as the abrasion-proof layer herein. The planar layer 203 is formed on the top of the chip structure 201 and on the chip surface 201S to overlay the semiconductor optical detection region for protecting the semiconductor structure 104. As the top of the chip structure 201 may have many convexes and concaves (as shown in the figure) after the metal layer and the electrode are formed thereon due to the semiconductor layout, the non-uniform has a negative effect to the optical detection and a weaker weather-proof ability. Accordingly, the planar layer 203 is formed on the top to allow the thin semiconductor structure 104 to have a flat surface to be suitable to the present disclosure. In the present disclosure, as the thin semiconductor structure 104 is exposed to air and directly in contact with the user's body frequently, a better abrasion-proof ability is required. In the semiconductor manufacturing technology nowadays, the polyimide-based material may be selected as the abrasion-proof material. Meanwhile, the planar layer 203 is preferably transparent to visible or invisible light according to the selection of the light source. In addition, the abrasion-proof material may be glass material or the like. For example, the abrasion-proof layer may be a glass layer.

It should be noted that in order to reduce the diffusion of light when the light passes through the planar layer 203 to blur the image, preferably a distance from the surface of the semiconductor structure 104 to the surface of the chip structure 201, i.e. the thickness of the planar layer 203 herein, is limited to be smaller than 100 micrometers. That is, a distance from the chip surface 201S to an upper surface of the planar layer 203 (i.e. the abrasion-proof layer) is preferably smaller than 100 micrometers. When detecting the biometric characteristic, the upper surface of the planar layer 203 is configured to be directly in contact with a body surface of the part of human body such that light emitted from the light source 101 directly illuminates the body surface and sequentially passes through the part of human body and the planar layer 203 to be detected by the semiconductor optical detection region. In one embodiment, a distance between an emission surface of the light source 101 and the substrate surface 102S is identical to a distance between the upper surface of the planar surface 203 and the substrate surface 102S. That is, when an emission surface of the light source 101 and an upper surface of the planar surface 203 have an identical height, the light emitted by the light source 101 may efficiently pass through the body surface to enter the part of human body and be detected by the semiconductor optical detection region.

The difference between FIG. 4b and FIG. 4a is that the planar layer 203 in FIG. 4b does not have enough abrasion-proof ability, and thus another abrasion-proof layer 205 is formed upon the planar layer 203. Similarly, in order to reduce the diffusion of light when the light passes through the planar layer 203 and the abrasion-proof layer 205, in this embodiment a total thickness of the planar layer 203 and the abrasion-proof layer 205 is preferably limited to be smaller than 100 micrometers. In this embodiment, the planar layer 203 may be any material without considering the abrasion-proof ability and the abrasion-proof layer 205 may be made of polyimide-based abrasion-proof material. In addition, the abrasion-proof material may be glass material or the like. For example, the abrasion-proof layer may be a glass layer.

In the above embodiment, it is possible to arrange a plurality of detection regions, e.g. arranging a plurality of linear detection regions along a predetermined direction or inserting light sources between several linear detection regions. For example, the linear semiconductor optical detection regions may be arranged to adjacent to each other or the linear semiconductor optical detection regions and a plurality of light sources may be arranged alternatively so as to obtain a better optical imaging. As the detection principle is identical, details thereof are not described herein.

Said substrate 102 is configured to electrically connect the light source 101 and the detection pixels 103 and to allow the light source to emit light to enter the body tissue, and thus the substrate may be a flexible soft substrate or the hard substrate made of hard material without particular limitation.

The semiconductor optical detection region of the present disclosure may allow the user to directly put the finger or part of human body thereon without other optical mechanisms to perform the image scaling and the light transmission. And thin and durable features of the present invention is suitable to be applied to portable electronic devices, e.g. notebook computers, tablet computers, mouse devices, cell phones, TV remote controllers and so on. Furthermore, the present invention may be suitable to other electronic equipments such as the door lock and steering wheel of vehicles, the lock and handles of motorcycles, electronic door locks, home appliances, various electronic switches and so on.

In the above embodiments, according to the adopted light source, different light filters may be formed during manufacturing the detection pixels to allow the desired light to pass through the filter and be received by the detection pixels. The filters may be formed in conjunction with the semiconductor manufacturing process on the detection pixels using the conventional technology or formed on the detection pixels after the detection pixels are manufactured. In addition, by mixing the filtering material in the protection layer and/or the planar layer, the protection layer and/or the planar layer may have the optical filtering function. That is, in the embodiment of the present disclosure, said different detection pixels may be referred to the detection pixels with different light filters but not to the detection pixels different from each other.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A thin biometric detection module configured to detect at least one biometric characteristic of a part of human body, the thin biometric detection module comprising:
   a substrate having a substrate surface;
   a chip disposed on the substrate surface and comprising a semiconductor optical detection region;
   at least one light source disposed on the substrate surface; and
   an abrasion-proof layer formed on a chip surface of the chip without an optical mechanism for image scaling between the substrate surface and the abrasion-proof layer, and a distance from the chip surface to an upper surface of the abrasion-proof layer is smaller than 100 micrometers,
   wherein the upper surface of the abrasion-proof layer is configured to be directly in contact with a body surface of the part of human body when detecting the biometric characteristic such that light emitted from the light source directly illuminates the body surface and sequentially passes through the part of human body and the abrasion-proof layer to be detected by the semiconductor optical detection region.

2. The thin biometric detection module as claimed in claim 1, further comprising a planar layer between the abrasion-proof layer and the chip surface.

3. The thin biometric detection module as claimed in claim 1, wherein the thin biometric detection module comprises two light sources respectively configured to emit light of different wavelengths, and the semiconductor optical detection region comprises two types of detection pixels respectively configured to detect the light of different wavelengths.

4. The thin biometric detection module as claimed in claim 1, further comprising a control module integrated in the chip or on the substrate and configured to control the light source and the semiconductor optical detection region.

5. The thin biometric detection module as claimed in claim 4, wherein the control module is configured to detect the biometric characteristic according to optical images captured by the semiconductor optical detection region at different or identical times.

6. The thin biometric detection module as claimed in claim 4, wherein the control module is configured to control the semiconductor optical detection region to capture optical images at a frame rate higher than 300 frames per second.

7. The thin biometric detection module as claimed in claim 1, wherein a distance between the chip and the light source is smaller than 8 millimeters.

8. The thin biometric detection module as claimed in claim 1, wherein the biometric characteristic comprises at least one of a blood oxygenation, a vein texture, a fingerprint, a pulse and a blood pressure.

9. The thin biometric detection module as claimed in claim 1, wherein the semiconductor optical detection region comprising a plurality of detection pixels arranged in an elongated shape or a rectangular shape.

10. The thin biometric detection module as claimed in claim 1, wherein a distance between an emission surface of the light source and the substrate surface is identical to a distance between the upper surface of the abrasion-proof layer and the substrate surface.

11. A thin biometric detection module configured to detect at least one biometric characteristic of a part of human body, the thin biometric detection module comprising:
    a plurality of linear semiconductor optical detection regions;
    at least one light source;
    an abrasion-proof layer overlaid on the linear semiconductor optical detection regions without an optical mechanism for image scaling between the linear semiconductor optical detection regions and the abrasion-proof layer, and a thickness of the abrasion-proof layer is smaller than 100 micrometers; and
    a control module electrically coupled to the linear semiconductor optical detection regions and the light source and configured to detect the biometric characteristic according to optical images of a body surface of the part of human body captured by different of the linear semiconductor optical detection regions at different times,
    wherein an upper surface of the abrasion-proof layer is configured to be directly in contact with the body surface when detecting the biometric characteristic such that light emitted from the light source directly illuminates the body surface and sequentially passes through the part of human body and the abrasion-proof layer to be detected by the linear semiconductor optical detection regions.

12. The thin biometric detection module as claimed in claim 11, further comprising a planar layer between the abrasion-proof layer and the linear semiconductor optical detection regions, wherein a total thickness of the abrasion-proof layer and the planar layer is smaller than 100 micrometers.

13. The thin biometric detection module as claimed in claim 11, wherein the thin biometric detection module comprises two light sources respectively configured to emit light of different wavelengths, and the linear semiconductor optical detection regions comprise two types of detection pixels respectively configured to detect the light of different wavelengths.

14. The thin biometric detection module as claimed in claim 11, wherein the linear semiconductor optical detection regions are arranged in parallel along a predetermined direction.

15. The thin biometric detection module as claimed in claim 11, wherein the control module is configured to control the linear semiconductor optical detection regions to capture the optical images at a frame rate higher than 300 frames per second.

16. The thin biometric detection module as claimed in claim 11, wherein a distance between the linear semiconductor optical detection regions and the light source is smaller than 8 millimeters.

17. The thin biometric detection module as claimed in claim 11, wherein the biometric characteristic comprises at least one of a fingerprint, a vein texture, a pulse and a blood pressure.

18. The thin biometric detection module as claimed in claim 11, wherein a height of an emission surface of the light source is identical to that of an upper surface of the abrasion-proof layer.

19. The thin biometric detection module as claimed in claim 11, wherein the linear semiconductor optical detection regions are arranged adjacent to each other, or the linear semiconductor optical detection regions and a plurality of light sources are arranged alternatively.

20. A thin biometric detection module configured to detect at least one biometric characteristic of a part of human body, the thin biometric detection module comprising:

a semiconductor optical detection region configured to capture a plurality of optical images of a body surface of the part of human body at a frame rate higher than 300 frames per second;

at least one light source;

an abrasion-proof layer overlaid on the semiconductor optical detection region without an optical mechanism for image scaling between the semiconductor optical detection region and the abrasion-proof layer, and a thickness of the abrasion-proof layer is smaller than 100 micrometers; and;

a control module electrically coupled to the semiconductor optical detection region and the light source and configured to generate a surface image associated with the body surface according to the optical images captured by the semiconductor optical detection region at different times to accordingly detect the biometric characteristic according to the surface image, wherein an upper surface of the abrasion-proof layer is configured to be directly in contact with the body surface when detecting the biometric characteristic such that light emitted from the light source directly illuminates the body surface and sequentially passes through the part of human body and the abrasion-proof layer to be detected by the semiconductor optical detection region.

* * * * *